(12) United States Patent
Sugiyama

(10) Patent No.: US 11,009,784 B2
(45) Date of Patent: May 18, 2021

(54) PROJECTOR HAVING COOLER

(71) Applicant: SEIKO EPSON CORPORATION, Tokyo (JP)

(72) Inventor: Nobuo Sugiyama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/817,815

(22) Filed: Mar. 13, 2020

(65) Prior Publication Data

US 2020/0292925 A1 Sep. 17, 2020

(30) Foreign Application Priority Data

Mar. 15, 2019 (JP) .............................. JP2019-048654

(51) Int. Cl.
| | |
|---|---|
| G03B 21/16 | (2006.01) |
| F28D 15/02 | (2006.01) |
| H04N 9/31 | (2006.01) |
| F28D 21/00 | (2006.01) |

(52) U.S. Cl.
CPC .............. *G03B 21/16* (2013.01); *F28D 15/02* (2013.01); *F28D 21/0015* (2013.01); *H04N 9/3144* (2013.01); *F28D 2021/0028* (2013.01)

(58) Field of Classification Search
CPC ...... G03B 21/00–64; H04N 9/31–3197; F28D 15/00–06; F28D 21/00–0017; F28D 2021/0019–0098
See application file for complete search history.

(56) References Cited

U.S. PATENT DOCUMENTS

| | | | |
|---|---|---|---|
| 6,588,907 B1* | 7/2003 | Billington | .............. G03B 21/16 348/748 |
| 8,517,540 B2 | 8/2013 | Terao | |
| 2002/0191159 A1 | 12/2002 | Nagao et al. | |
| 2010/0118279 A1* | 5/2010 | Itsuki | .................. H04N 9/3167 353/54 |
| 2010/0132379 A1 | 6/2010 | Wu et al. | |
| 2011/0242499 A1 | 10/2011 | Terao | |
| 2019/0196311 A1 | 6/2019 | Sligiyama et al. | |

FOREIGN PATENT DOCUMENTS

| | | |
|---|---|---|
| JP | 2002-107698 A | 4/2002 |
| JP | 2002-372748 A | 12/2002 |
| JP | 2007-294655 A | 11/2007 |
| JP | 2010-085676 A | 4/2010 |
| JP | 2010-107751 A | 5/2010 |
| JP | 2011-036768 A | 2/2011 |
| JP | 2011-215457 A | 10/2011 |
| JP | 2014-087797 A | 5/2014 |
| JP | 2019-117332 A | 7/2019 |

\* cited by examiner

*Primary Examiner* — Michelle M Iacoletti
*Assistant Examiner* — Christopher A Lamb, II
(74) *Attorney, Agent, or Firm* — Oliff PLC

(57) ABSTRACT

A projector includes a light source, a light modulator, a projection optical apparatus, a cooler configured to cool a cooling target based on transformation of a refrigerant into a gas, and a controller configured to control the cooler. The cooler includes a refrigerant generator configured to generate the refrigerant, a refrigerant sender configured to send the generated refrigerant toward the cooling target, and a cooling blower configured to deliver air to the cooling target. The controller drives at least part of the cooler for a predetermined period in the state in which the projector is not in operation.

13 Claims, 8 Drawing Sheets

PROJECTOR HAVING COOLER

The present application is based on, and claims priority from JP Application Serial Number 2019-048654, filed Mar. 15, 2019, the disclosure of which is hereby incorporated by reference herein in its entirety.

BACKGROUND

1. Technical Field

The present disclosure relates to a projector.

2. Related Art

As a unit that cools a projector, there have been proposed cooling units, for example, an air-based cooling unit shown in JP-A-2002-107698 using a blower and a liquid-based cooling unit shown in JP-A-2007-294655 using a pump that delivers a refrigerant liquid and a pipe through which the refrigerant liquid passes.

In recent years, an increase in luminance of light outputted from a projector and other factors increase the amount of heat produced by a cooling target to be cooled by a cooling unit, and the cooling performance of the cooling unit is required to be improved. To improve the cooling performance of the cooling unit described above based, for example, on air or liquid, however, the cooling unit is enlarged, resulting in a problem of an increase in the size of the projector. Further, in the case of the air-based cooling, there is also a problem of an increase in noise produced by the blower.

SUMMARY

An aspect of a projector according to the present disclosure is a projector including a cooling target, the projector including a light source configured to emit light, a light modulator configured to modulate the light emitted from the light source in accordance with an image signal, a projection optical apparatus configured to project the light modulated by the light modulator, a cooler configured to cool the cooling target based on transformation of a refrigerant into a gas, and a controller configured to control the cooler. The cooler includes a refrigerant generator configured to generate the refrigerant, a refrigerant sender configured to send the generated refrigerant toward the cooling target, and a cooling blower configured to deliver air to the cooling target. The controller drives at least part of the cooler for a predetermined period in a state in which the projector is not in operation.

The controller may drive the refrigerant generator to generate the refrigerant for a predetermined refrigerant generation period in the state in which the projector is not in operation.

The controller may drive the cooling blower for a predetermined cooling period after the projector stops operation thereof.

The controller may drive the refrigerant generator to generate the refrigerant for a predetermined refrigerant generation period in the state in which the projector is not in operation and drive the cooling blower for a predetermined cooling period after operation of driving the refrigerant generator for the refrigerant generation period is completed.

The refrigerant generator may include a rotating moisture absorbing/discharging member, a first blower configured to deliver air to a portion of the moisture absorbing/discharging member that is a portion located in a first region, a heat exchanger connected to the refrigerant sender, a heater configured to heat a portion of the moisture absorbing/discharging member that is a portion located in a second region different from the first region, and a second blower configured to deliver, to the heat exchanger, air around a portion of the moisture absorbing/discharging member that is the portion heated by the heater, and the heat exchanger, when cooled, may generate the refrigerant from the air flowing into the heat exchanger.

The controller may drive the second blower for a predetermined air blow period after the projector stops operation thereof.

The controller may drive the refrigerant generator to generate the refrigerant for a predetermined refrigerant generation period in the state in which the projector is not in operation and drive the second blower for a predetermined air blow period after operation of driving the refrigerant generator for the refrigerant generation period is completed.

The refrigerant generator may include a driver configured to rotate the moisture absorbing/discharging member, and the controller may drive the driver to rotate the moisture absorbing/discharging member for a predetermined rotation period after the operation of driving the refrigerant generator for the refrigerant generation period is completed.

The refrigerant generator may include a driver configured to rotate the moisture absorbing/discharging member, and the controller may drive the driver to rotate the moisture absorbing/discharging member for a predetermined rotation period after the projector stops operation thereof.

The controller may drive the refrigerant generator to generate the refrigerant for a predetermined refrigerant generation period in the state in which the projector is not in operation and drive the driver to rotate the moisture absorbing/discharging member for the rotation period after the operation of driving the refrigerant generator for the refrigerant generation period is completed.

The first blower may be the cooling blower.

The projector may further include an electricity accumulator configured to supply the cooler with electric power, and the controller may drive the at least part of the cooler by using the electric power supplied from the electricity accumulator in the state in which the projector is not in operation.

The cooling target may be the light modulator.

DESCRIPTION OF EXEMPLARY EMBODIMENTS

A projector according to an embodiment of the present disclosure will be described below with reference to the drawings. The scope of the present disclosure is not limited to the following embodiment and can be arbitrarily changed within the scope of the technical idea of the present disclosure. In the following drawings, for clarity of each configuration, the scale, the number, and other factors of the structure of the configuration differ from the scale, the number, and the other factors of an actual structure of the configuration in some cases.

Figure 1:
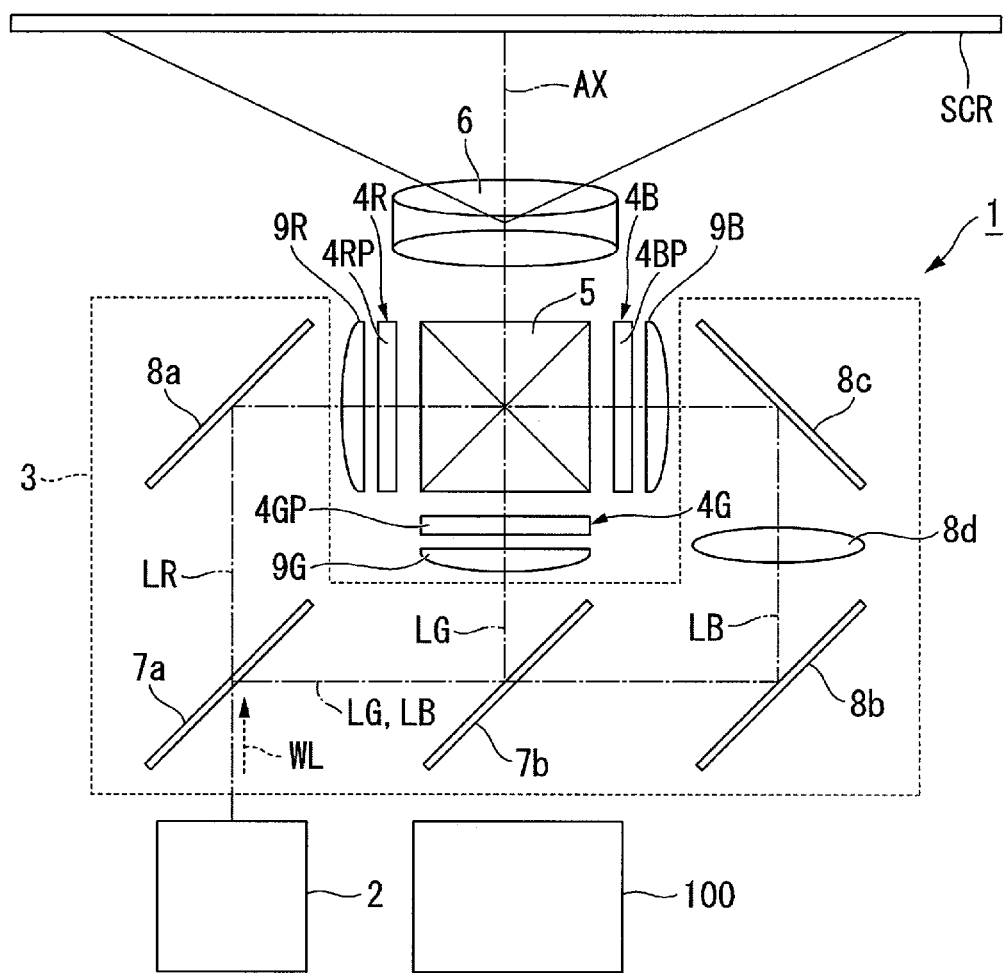
FIG. 1 is a schematic configuration diagram showing a projector according to an embodiment.
Figure 2:
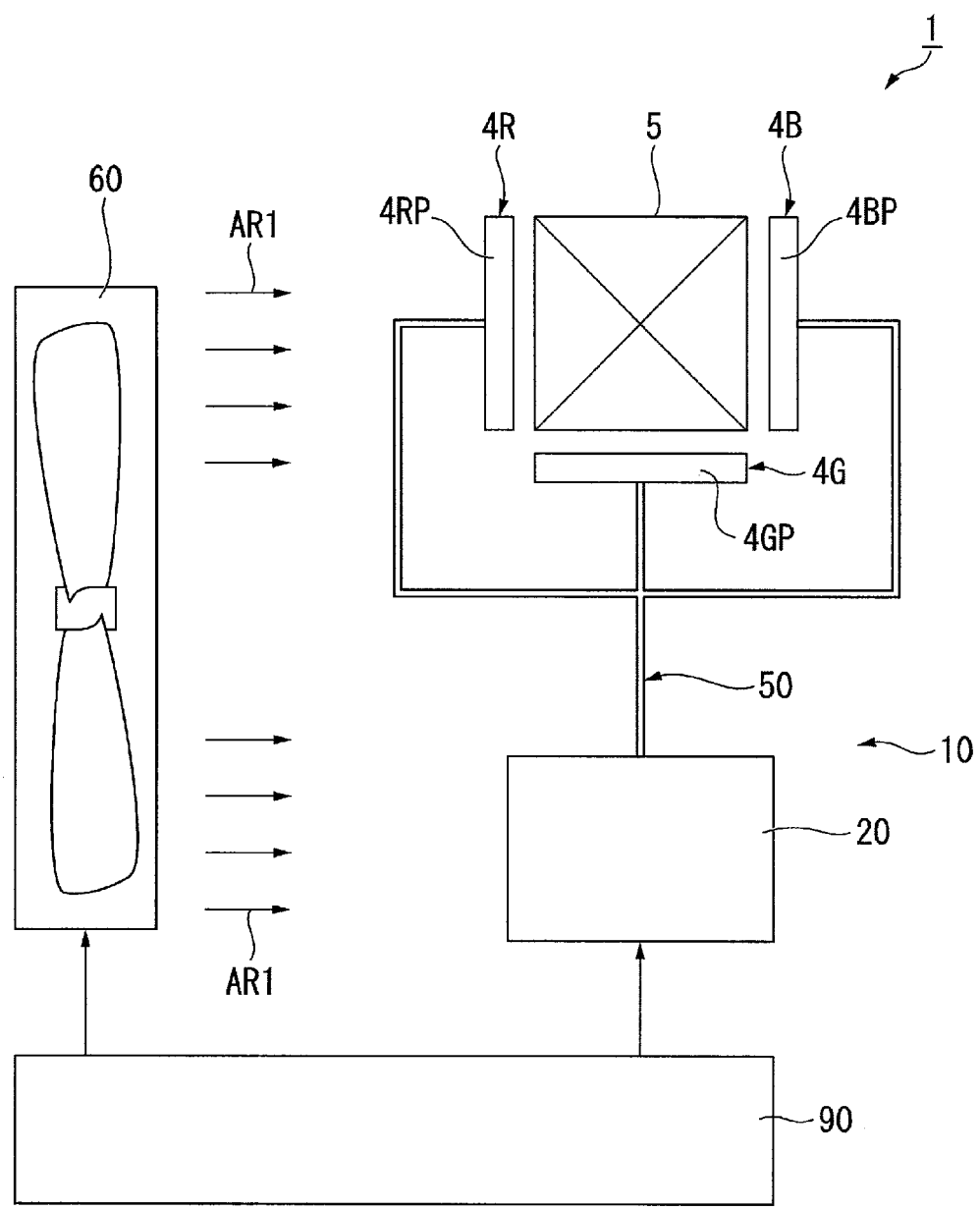
FIG. 2 is a diagrammatic view showing part of the projector according to the embodiment.

FIG. 1 is a schematic configuration diagram showing a projector 1 according to the present embodiment. FIG. 2 is a diagrammatic view showing part of the projector 1 according to the present embodiment. The projector 1 includes a light source apparatus 2, a color separation system 3, a light modulation unit 4R, a light modulation unit 4G, a light modulation unit 4B, a light combining system 5, a projection optical apparatus 6, and an electricity accumulator 100, as shown in FIG. 1. The light modulation unit 4R includes alight modulator 4RP. The light modulation unit 4G includes a light modulator 4GP. The light modulation unit 4B includes a light modulator 4BP.

The light source apparatus 2 outputs illumination light WL, which is so adjusted to have a substantially uniform illuminance distribution, toward the color separation system 3. The light source apparatus 2 includes, for example, a semiconductor laser as a light source. The color separation system 3 separates the illumination light WL from the light source apparatus 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source apparatus 2 into the red light LR and light containing the green light LG and the blue light LB mixed with each other. The first dichroic mirror 7a is so characterized as to transmit the red light LR and reflect the green light LG and the blue light LB. The second dichroic mirror 7b separates the light containing the green light LG and the blue light LB mixed with each other into the green light LG and the blue light LB. The second dichroic mirror 7b is so characterized as to reflect the green light LG and transmit the blue light LB.

The first reflection mirror 8a is disposed in the optical path of the red light LR and reflects the red light LR having passed through the first dichroic mirror 7a toward the light modulator 4RP. The second reflection mirror 8b and the third reflection mirror 8c are disposed in the optical path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light outputted from the light source apparatus 2 in accordance with an image signal. The light modulator 4GP modulates the green light LG out of the light outputted from the light source apparatus 2 in accordance with an image signal. The light modulator 4BP modulates the blue light LB out of the light outputted from the light source apparatus 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a substantially cubic shape. The light combining system 5 combines the color image light fluxes from the light modulators 4RP, 4GP, and 4BP with one another. The light combining system 5 outputs the combined image light toward the projection optical apparatus 6. The projection optical apparatus 6 is formed of a projection lens group. The projection optical apparatus 6 enlarges the combined image light from the light combining system 5, that is, the light fluxes modulated by the light modulators 4RP, 4GP, and 4BP and projects the enlarged image light or modulated light fluxes toward a screen SCR. An enlarged color image (video) is thus displayed on the screen SCR.

The electricity accumulator 100 can supply each portion of the projector 1 with electric power. The electricity accumulator 100 can supply a cooler 10, which will be described above, with electric power. The electricity accumulator 100 is, for example, a chargeable battery charged by an external power supply that supplies the projector 1 with electric power.

The projector 1 further includes the cooler 10, as shown in FIG. 2. The cooler 10, in which a refrigerant W is transformed into a gas, cools a cooling target provided in the projector 1. In the present embodiment, the refrigerant W is, for example, liquid water. In the following description, the transformation of the refrigerant W into a gas is therefore simply called vaporization in some cases. In the present embodiment, the cooling target includes the light modulation units 4R, 4G, and 4B. That is, in the present embodiment, the cooling target includes the light modulators 4RP, 4GP, and 4BP.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target, that is, the light modulation units 4R, 4G, and 4B in the present embodiment vaporizes so as to be capable of drawing heat from the cooling target, whereby the cooler 10 can cool the cooling target. The refrigerant generator 20 and the refrigerant sender 50 will be described below in detail.

Figure 3:
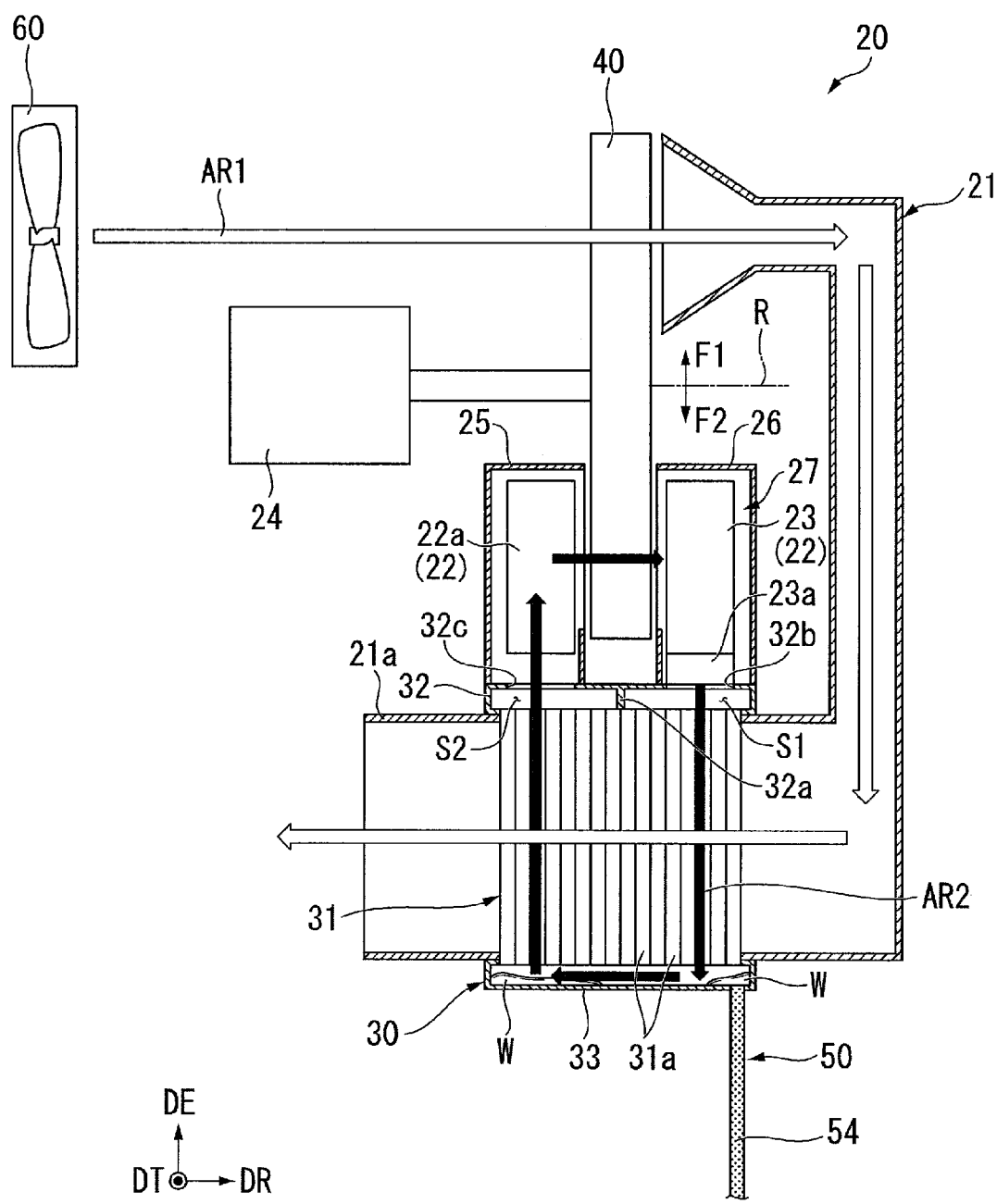
FIG. 3 is a schematic configuration diagram diagrammatically showing a refrigerant generator in the embodiment.

FIG. 3 is a schematic configuration diagram diagrammatically showing the refrigerant generator 20 in the present embodiment. The refrigerant generator 20 includes a moisture absorbing/discharging member 40, a motor (driver) 24, a first blower (cooling blower) 60, a heat exchanger 30, a circulation duct 25, a circulation duct 26, a heater 22, a second blower 23, and a cooling duct 21, as shown in FIG. 3.

Figure 4:
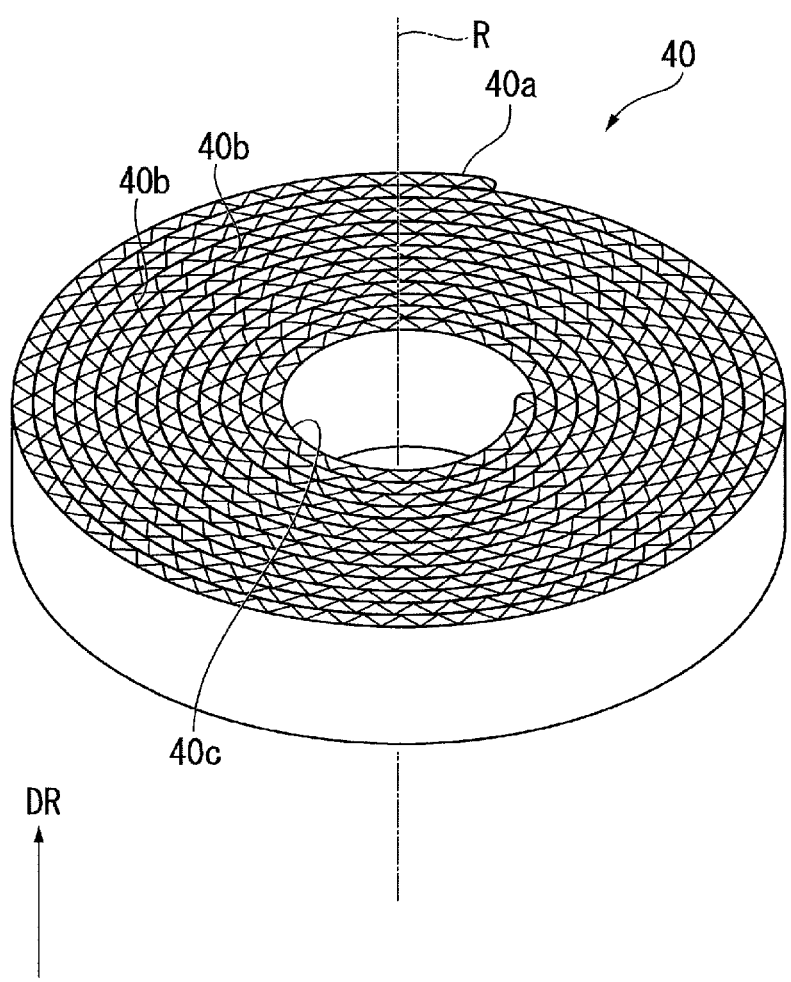
FIG. 4 is a perspective view of a moisture absorbing/discharging member in the embodiment.

FIG. 4 is a perspective view showing the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR in the drawings.

The moisture absorbing/discharging member 40 has an innumerable number of through holes 40b, which pass through the moisture absorbing/discharging member 40 in the rotational axis direction DR. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. A surface of the wound band-shaped member 40a that is the surface exposed to the ambient environment includes the outer surface of the moisture absorbing/discharging member 40, the inner circumferential surface of the central hole 40c, and the inner surface of each of the through holes 40b. The moisture absorbing/discharging member 40 may instead be entirely made of a substance that absorbs and discharges moisture. An example of the substance that absorbs and discharges moisture may include zeolite and silica gel.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 0.2 rpm but smaller than or equal to 5 rpm.

The first blower 60 is, for example, an intake fan that takes outside air into the projector 1. The first blower delivers air AR1 to a portion of the moisture absorbing/discharging member 40 that is the portion located in a first region F1. The first region F1 is a region on one side of the axis of rotation R in the direction perpendicular to the axis of rotation R. On the other hand, the region on the other side of the axis of rotation R in the direction perpendicular to the axis of rotation R, that is, the region opposite the first region F1 with respect to the axis of rotation R is a second region F2. The first region F1 is a region above the axis of rotation R in FIG. 3. The second region F2 is a region below the axis of rotation R in FIG. 3.

The first blower 60 delivers the air AR1 also to the light modulation units 4R, 4G, and 4B, which are each the cooling target, as shown in FIG. 2. That is, in the present embodiment, the first blower 60 is a cooling blower that delivers the air AR1 to the cooling target. The first blower 60 is not limited to a specific apparatus and may be any apparatus capable of delivering the air AR1, for example, an axial fan and a centrifugal fan.

Figure 5:
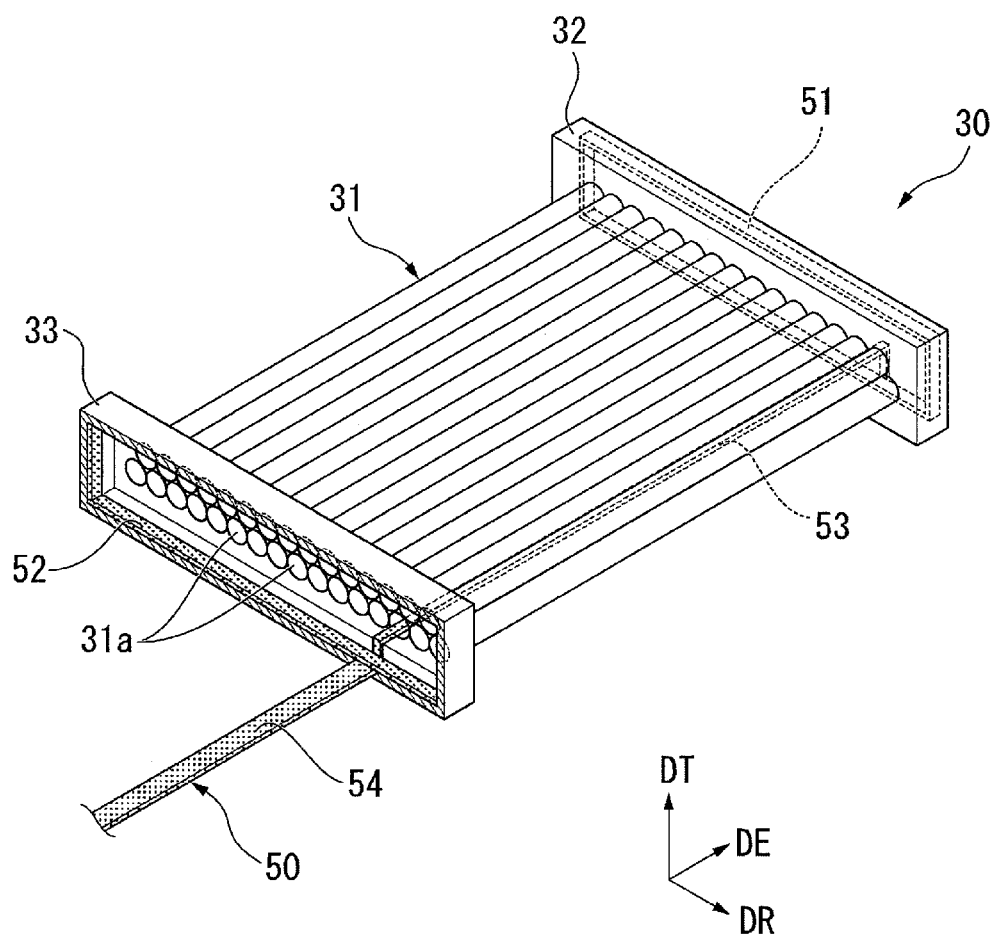
FIG. 5 is a partial cross-sectional perspective view showing a heat exchanger in the embodiment.

The heat exchanger 30 is a portion that generates the refrigerant W. FIG. 5 is a partial cross-sectional perspective view showing the heat exchanger 30. The heat exchanger 30 includes a flow passage section 31, a first lid 32, and a second lid 33, as shown in FIG. 5.

The flow passage section 31 includes a plurality of tubular pipes 31a extending in one direction. In the present embodiment, the one direction in which the pipes 31a extend is, for example, perpendicular to the rotational axis direction DR. The pipes 31a each open at the opposite ends thereof in the one direction in which the pipe 31a extends. The pipes 31a each have, for example, a circular cross-sectional shape perpendicular to the one direction in which the pipe 31a extends. In the following description, the one direction in which the pipes 31a extend is called an "extension direction DE" and drawn as appropriate in the form of an axis DE in the drawings. The first region F1 and the second region F2 described above are separate with respect to the axis of rotation R from each other in the extension direction DE perpendicular to the rotational axis direction DR.

In the present embodiment, the flow passage section 31 is formed by layering a plurality of layers, which are each formed of a plurality of pipes 31a arranged in the rotational axis direction DR, on each other in the direction perpendicular both to the rotational axis direction DR and the extension direction DE. In the following description, the direction perpendicular both to the rotational axis direction DR and the extension direction DE is called a "thickness direction DT" and drawn as appropriate in the form of an axis DT in the drawings. In the present embodiment, the dimension of the flow passage section 31 in the thickness direction DT is, for example, smaller than the dimension of the flow passage section 31 in the rotational axis direction DR or is the smallest of the dimensions of the flow passage section 31 in the directions perpendicular to the extension direction DE.

The first lid 32 is connected to an end of the flow passage section 31 that is the end on one side in the extension direction DE (+DE side). The first lid 32 has the shape of a rectangular parallelepiped box elongated in the rotational axis direction DR. One end of each of the pipes 31a in the extension direction DE opens in the first lid 32. A partition 32a is provided in the first lid 32, as shown in FIG. 3. The partition 32a partitions the interior of the first lid 32 into a first space S1 and a second space S2 disposed side by side in the rotational axis direction DR. In FIG. 3, the first space S1 is located on the right of the second space S2 (+DR side).

A communication hole 32b, which allows the first space S1 to be continuous with the interior of the circulation duct 26, is formed in the first lid 32. A communication hole 32c, which allows the second space S2 to be continuous with the interior of the circulation duct 25, is formed in the first lid 32.

The second lid 33 is connected to an end of the flow passage section 31 that is the end on the other side in the extension direction DE (−DE side), that is, the end opposite the end to which the first lid 32 is connected to the flow passage section 31. The second lid 33 has the shape of a rectangular parallelepiped box elongated in the rotational axis direction DR, as shown in FIG. 5. The other end of each of the pipes 31a in the extension direction DE opens in the second lid 33. The interior of the second lid 33 is not partitioned, unlike in the first lid 32. The interior of the second lid 33 is continuous with the first space S1 and the second space S2 in the first lid 32 via the interior of the pipes 31a of the flow passage section 31. The second lid 33 is connected to the refrigerant sender 50. The heat exchanger 30 is thus connected to the refrigerant sender 50. In FIG. 5, a wall of the second lid 33 that is the wall located on the other side in the extension direction DE is omitted.

The circulation duct 26 is a duct disposed on one side of the moisture absorbing/discharging member 40 in the rotational axis direction DR (+DR side), as shown in FIG. 3. The circulation duct 26 has an inlet on the other side in the rotational axis direction DR (−DR side) that opens toward a portion of the moisture absorbing/discharging member 40 that is the portion located in the second region F2. The circulation duct 26 has an outlet continuous with the communication hole 32*b* in the first lid 32.

The circulation duct 25 is a duct disposed on the other side of the moisture absorbing/discharging member 40 in the rotational axis direction DR (−DR side). The circulation duct 25 has an outlet on the one side in the rotational axis direction DR (+DR side) that opens toward a portion of the moisture absorbing/discharging member 40 that is the portion located in the second region F2. The circulation duct 25 has an inlet continuous with the communication hole 32*c* in the first lid 32.

The heater 22 includes a heating main body 22*a*. The heating main body 22*a* is disposed in the circulation duct 25. The heating main body 22*a* is disposed on the other side, in the rotational axis direction DR (−DR side), of a portion of the moisture absorbing/discharging member 40 that is the portion located in the second region F2. The heating main body 22*a* is, for example, an electric heater. The heating main body 22*a* heats the atmosphere (air) in the circulation duct 25. In the present embodiment, the heater 22 includes the second blower 23.

The second blower 23 is disposed in the circulation duct 26. The second blower 23 is disposed on the one side), in the rotational axis direction DR (+DR side, of a portion of the moisture absorbing/discharging member 40 that is the portion located in the second region F2. The second blower 23 is, for example, a centrifugal fan. The second blower 23 discharges air sucked from the other side in the rotational axis direction DR (−DR side) via an exhaust port 23*a* toward the other side in the extension direction DE (−DE side). The exhaust port 23*a* opens toward the communication hole 32*b* in the first lid 32. The second blower 23 delivers the air into the first space S1 via the communication hole 32*b*.

The air discharged from the second blower 23 into the first space S1 is the air having been sucked from the other side of the second blower 23 in the rotational axis direction DR (−DR side) via the inlet of the circulation duct 26 and having passed through a portion of the moisture absorbing/discharging member 40 that is the portion located in the second region F2. That is, the second blower 23 causes the air to pass through a portion of the moisture absorbing/discharging member 40 that is the portion located in the second region F2, which differs from the first region F1, and delivers the air to the heat exchanger 30. In the present embodiment, the air before passing through a portion of the moisture absorbing/discharging member 40 that is the portion located in the second region F2 has flowed in the circulation duct 25. The heating main body 22*a* therefore heats the air before passing through a portion of the moisture absorbing/discharging member 40 that is the portion located in the second region F2.

As described above, in the present embodiment, the heater 22 heats a portion of the moisture absorbing/discharging member 40 that is the portion located in the second region F2 with the aid of the second blower 23, which delivers the air heated by the heating main body 22*a* to a portion of the moisture absorbing/discharging member 40 that is the portion located in the second region F2. The second blower 23 thus delivers air around a portion of the moisture absorbing/discharging member 40 that is the portion heated by the heater 22 to the heat exchanger 30.

The air having flowed from the second blower 23 into the heat exchanger 30 via the first space S1 passes through the pipes 31*a* continuous with the first space S1 out of the plurality of pipes 31*a* and flows into the second lid 33. The air having flowed into the second lid 33 passes through the pipes 31*a* continuous with the second space S2 out of the plurality of pipes 31*a*, flows into the second space S2, and flows into the circulation duct 25 via the communication hole 32*c*. The air having flowed into the circulation duct 25 is heated by the heating main body 22*a*, passes through a portion of the moisture absorbing/discharging member 40 that is the portion located in the second region F2 again, flows into the second circulation duct 26, and is sucked by the second blower 23.

As described above, in the present embodiment, the refrigerant generator 20 has a circulation path 27, through which the air discharged from the second blower 23 circulates. The circulation path 27 is formed of at least the circulation ducts 25 and 26 and the heat exchanger 30. The circulation path 27 passes through the heating main body 22*a*, the moisture absorbing/discharging member 40, and the heat exchanger 30. The circulation path 27 is substantially sealed although small gaps are provided between the moisture absorbing/discharging member 40 and the circulation ducts 25, 26, and entry of air outside the circulation path 27 into the circulation path 27 is therefore suppressed. In the following description, the air discharged from the second blower 23 and circulating through the circulation path 27 is called air AR2.

The cooling duct 21 is a duct having an inlet disposed on the one side, in the rotational axis direction DR (+DR side), of a portion of the moisture absorbing/discharging member 40 that is the portion located in the first region F1. Air flowing into the cooling duct 21 is the air AR1 having been discharged from the first blower 60 and having passed through a portion of the moisture absorbing/discharging member 40 that is the portion located in the first region F1. The cooling duct 21 extends from a region on the one side of a portion of the moisture absorbing/discharging member 40 that is the portion located in the first region F1 toward the heat exchanger 30.

The cooling duct 21 includes a cooling passage 21*a*, which extends in the rotational axis direction DR. The flow passage section 31 of the heat exchanger 30 is so disposed in the cooling passage 21*a* as to pass thereacross in the extension direction DE. The flow passage section 31 is thus disposed in the cooling passage 21*a*. The air AR1 passing through the cooling passage 21*a* is sprayed onto the outer surface of the flow passage section 31 and passes by the flow passage section 31 in the rotational axis direction DR. The flow passage section 31 is thus cooled by the air AR1. That is, the heat exchanger 30 is cooled by the air AR1 having been discharged from the first blower 60 and having passed through the moisture absorbing/discharging member 40. In FIG. 3, the air AR1 in the cooling passage 21*a* passes by the flow passage section 31 from right to left. The cooling passage 21*a* has an open end facing the other side in the rotational axis direction DR (−DR side). The opening of the cooling passage 21*a* is, for example, of an outlet of the cooling duct 21.

When the air AR1 is delivered from the first blower 60 to a portion of the moisture absorbing/discharging member 40 that is the portion located in the first region F1, water vapor contained in the air AR1 is absorbed by a portion of the moisture absorbing/discharging member 40 that is the portion located in the first region F1. A portion of the moisture absorbing/discharging member 40 that is the portion having absorbed the water vapor moves from the first region F1 to the second region F2 when the motor 24 rotates the moisture absorbing/discharging member 40. The air AR2 heated by the heating main body 22a and therefore having a relatively high temperature then passes through a portion of the moisture absorbing/discharging member 40 that is the portion located in the second region F2. The moisture absorbed by the moisture absorbing/discharging member 40 thus vaporizes and is discharged into the air AR2.

The air AR2 having passed through the moisture absorbing/discharging member 40 and therefore containing the water vapor absorbed from the air AR1 is delivered by the second blower 23 to the heat exchanger 30. The air AR2 having flowed via the first space S1 into the heat exchanger 30 flows through the flow passage section 31. In more detail, the air AR2 flows through part of the pipes 31a of the flow passage section 31. The flow passage section 31 is externally cooled by the air AR1 flowing along the rotational axis direction DR through the cooling passage 21a of the cooling duct 21.

When the flow passage section 31 is cooled, the air AR2 flowing through part of the pipes 31a and having a relatively high temperature is cooled, so that the water vapor contained in the air AR2 condenses into liquid water, that is, the refrigerant W. The heat exchanger 30, when cooled, thus generates the refrigerant W from the air AR2 having flowed into the heat exchanger 30.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, a third catcher 53, and a connector 54, as shown in FIG. 5.

The first catcher 51 is fixed to an edge portion of an inner surface of the first lid 32 that is the inner surface facing the one side in the extension direction DE (+DE side). The first catcher 51 has a thin-band-like shape and is formed in a rectangular-frame-like shape extending along the edge portion of the first lid 32. The second catcher 52 is fixed to an edge portion of an inner surface of the second lid 33 that is the inner surface facing the other side in the extension direction DE (−DE side). The second catcher 52 has a thin-band-like shape and is formed in a rectangular-frame-like shape extending along the edge portion of the second lid 33.

The third catcher 53 extends from the first catcher 51, passes through a pipe 31a, and reaches the second catcher 52, so that the third catcher 53 connects the first catcher 51 to the second catcher 52. The third catcher 53 has a thin-band-like shape extending in the extension direction DE. In the present embodiment, the third catcher 53 is disposed in one of the plurality of pipes 31, as shown in FIG. 5, but not necessarily. The third catcher 53 may be provided in each of part of the plurality of pipes 31a or may be provided in each of the plurality of pipes 31a. When the third catcher 53 is provided in each of part of the plurality of pipes 31, the third catchers 53 may be provided in two or more pipes 31a.

Figure 6:
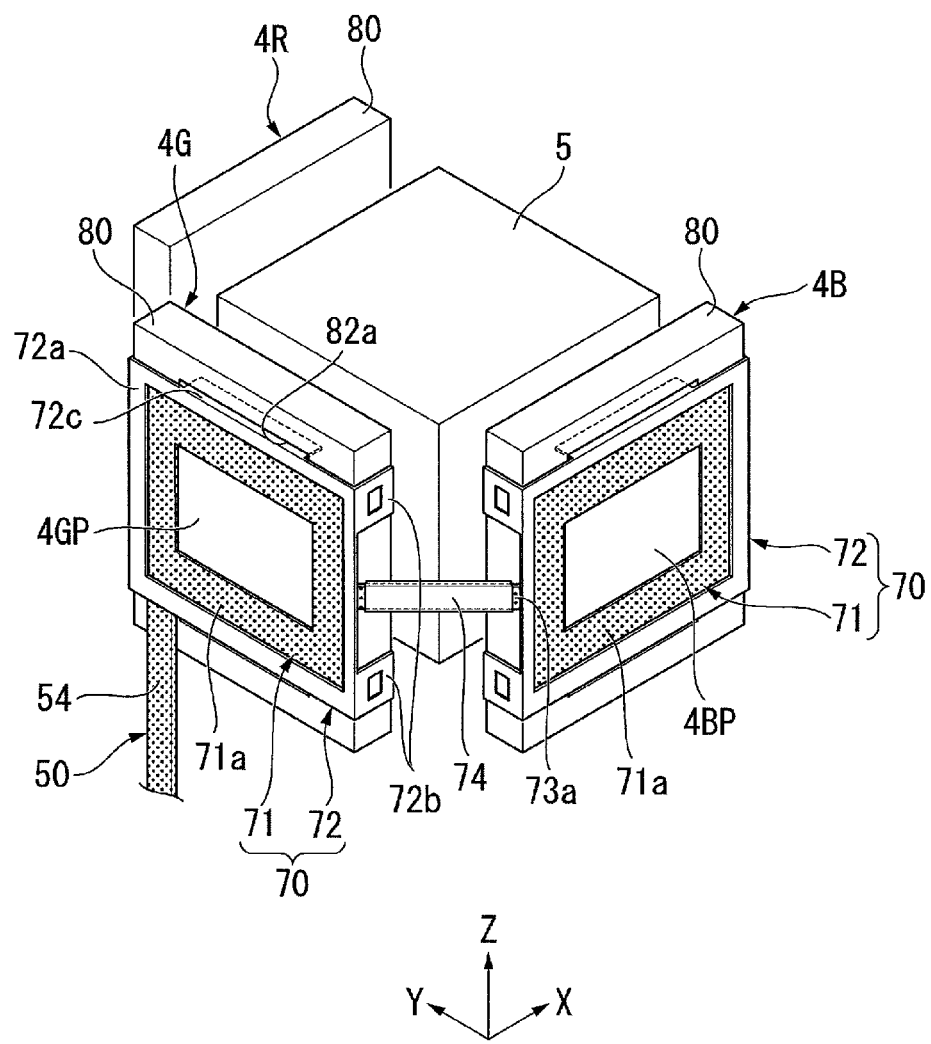
FIG. 6 is a perspective view showing light modulation units and a light combining system in the embodiment.

The connector 54 is a portion that connects the refrigerant generator 20 to the cooling target. In the present embodiment, the connector 54 is connected to the second catcher 52, extends from the interior of the second lid 33, passes through the wall of the second lid 32, and protrudes out of the second lid 33. The connector 54, which protrudes out of the second lid 33, extends to the light modulation unit 4G, which is part of the cooling target, as shown in FIG. 6. FIG. 6 is a perspective view showing the light modulation units 4R, 4G, and 4B and the light combining system 5. The connector 54 has a thin-band-like shape. The width of the connector 54 is, for example, greater than the width of the first catcher 51, the width of the second catcher 52, and the width of the third catcher 53.

The light modulation units 4R, 4G, and 4B, which are each the cooling target in the present embodiment, will next be described in more detail. In the following description, an upward/downward direction Z, with the upper side thereof being the positive side and the lower side thereof being the negative side, is drawn as appropriate in the form of an axis Z in the drawings. The direction parallel to an optical axis AX of a projection lens of the projection optical apparatus 6 that is the projection lens closest to the light exiting side, that is, the direction parallel to the direction in which the projection optical apparatus 6 projects light is called an "optical axis direction X" and drawn as appropriate in the form of an axis X in the drawings. The optical axis direction X is perpendicular to the upward/downward direction Z. The direction perpendicular both to the optical axis direction X and the upward/downward direction Z is called a "width direction Y" and drawn as appropriate in the form of an axis Y in the drawings.

The upward/downward direction Z and the upper and lower sides thereof are merely names for describing the relative positional relationship among the portions of the projector, and the actual arrangement and other factors of the portions may differ from the arrangement and other factors indicated by the names.

Figure 7:
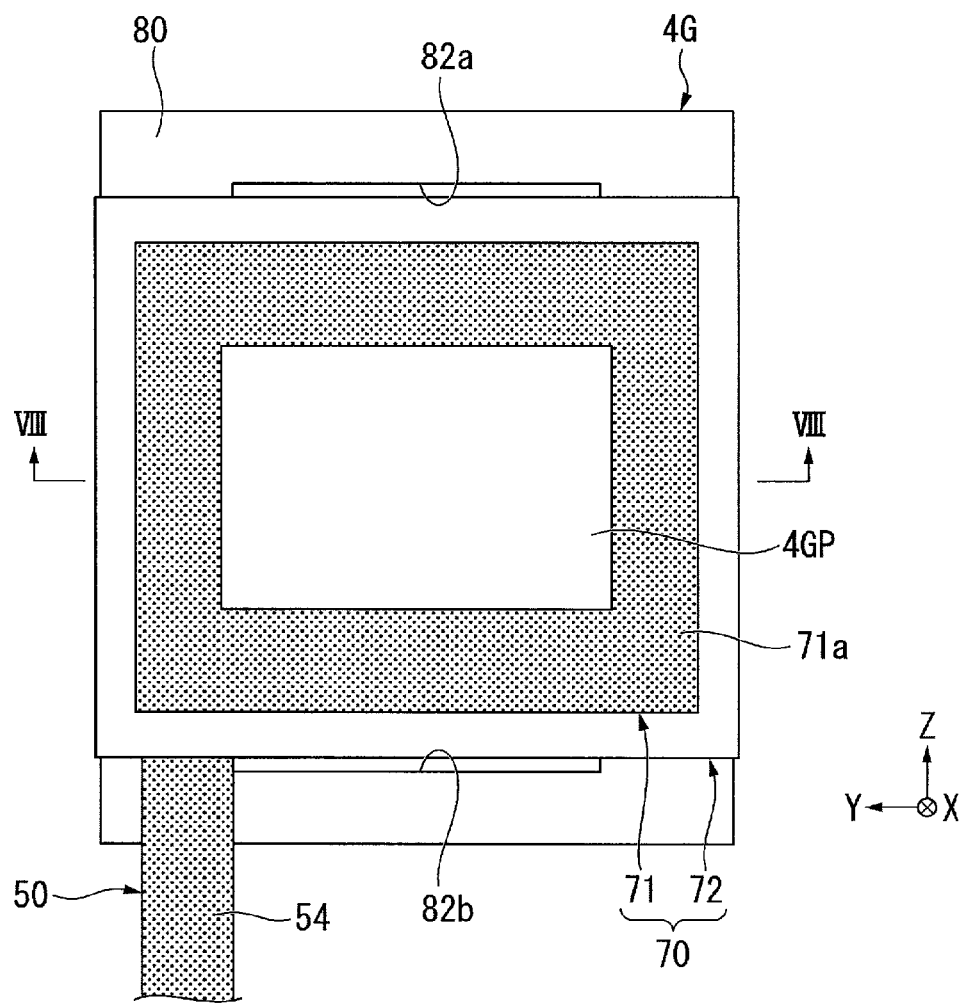
FIG. 7 shows one of the light modulation units in the embodiment viewed from the light incident side.
Figure 8:
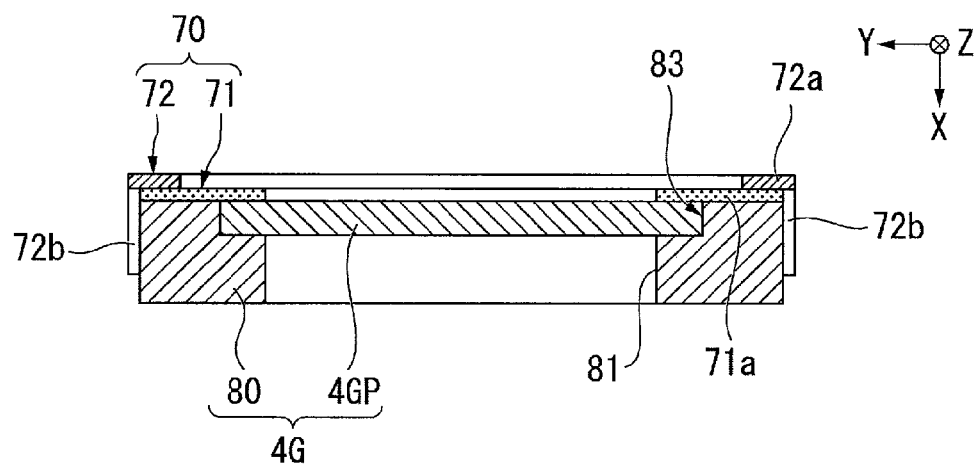
FIG. 8 is a cross-sectional view of the one light modulation unit in the embodiment taken along the line VIII-VIII in FIG. 7.

FIG. 7 shows the light modulation unit 4G viewed from the light incident side. FIG. 8 is a cross-sectional view of the light modulation unit 4G taken along the line VIII-VIII in FIG. 7.

The light modulation units 4R, 4G, and 4B, which are each the cooling target, are so disposed as to surround the light combining system 5, as shown in FIG. 6. The light modulation units 4R and 4B are so disposed on the opposite sides of the light combining system 5 as to sandwich the light combining system 5 in the width direction Y. The light modulation unit 4G is disposed on the light incident side of the light combining system 5 in the optical axis direction X (−X side). The light modulation units 4R, 4G, and 4B have the same structure except that they are disposed in different positions and take different attitudes, and only the light modulation unit 4G will therefore be representatively described below in some cases.

The light modulation unit 4G includes a holding frame 80, which holds the light modulator 4GP. The holding frame 80 has the shape of a substantially rectangular parallelepiped that is flat in the direction in which light is incident on the light modulator 4GP and elongated in the upward/downward direction Z, as shown in FIGS. 6 to 8. The direction in which light is incident on the light modulator 4GP is, for example, the optical axis direction X.

The holding frame 80 has a through hole 81, which passes through the holding frame 80 in the light incident direction, as shown in FIG. 8. A stepped section 83, where the width of the through hole 81 increases, is provided along an edge of the through hole 81 that is the edge on the light incident side (−X side). The light modulator 4GP is so held by the holding frame 80 as to be fit into the stepped section 83. Insertion grooves 82a and 82b are formed in portions of the light-incident-side surface of the holding frame 80 that are portions on the opposite sides of the holding frame 80 in the upward/downward direction Z, as shown in FIG. 7.

The projector 1 further includes a cooling facilitator 70 provided as part of the light modulation unit 4G, which is part of the cooling target, as shown in FIGS. 6 to 8. The cooling facilitator 70 includes a refrigerant holder 71 and a fixing member 72. The refrigerant holder 71 is attached to a surface of the holding frame 80, which holds the light modulation unit 4G, which is part of the cooling target. In the present embodiment, the refrigerant holder 71 is provided on a surface of the holding frame 80 that is the surface facing the light incident side of the light modulator 4GP (-X side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 9:
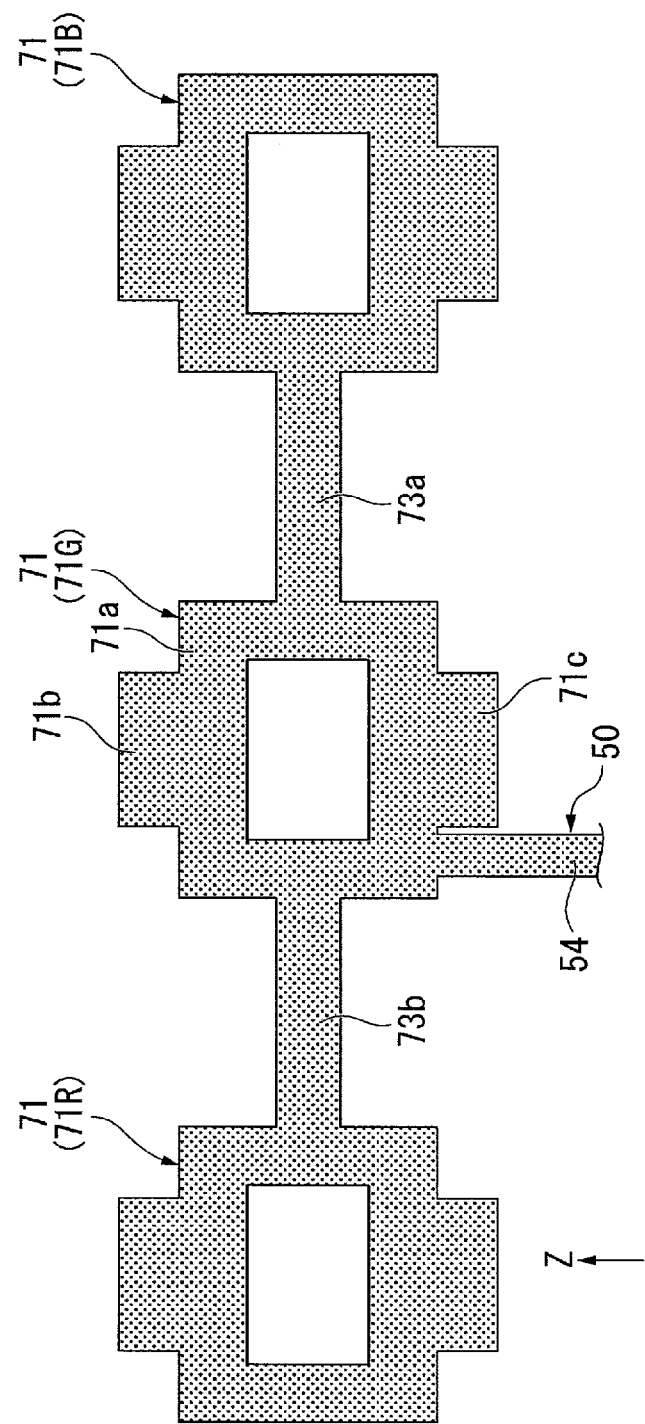
FIG. 9 shows refrigerant holders in the embodiment.

FIG. 9 shows the refrigerant holder 71. The refrigerant holder 71 includes a main body section 71a, which has a rectangular-frame-like shape, and insertion sections 71b and 71c, which are provided at opposite ends of the main body section 71a that are the opposite ends in the upward/downward direction Z, as shown in FIG. 9. The main body section 71a covers part of a surface of the holding frame 80 that is the surface facing the light incident side of the light modulator 4GP (-X side), as shown in FIG. 8. An inner edge portion of the main body section 71a covers an outer edge portion of the light modulator 4GP. The insertion section 71b is bent and inserted into the insertion groove 82a of the holding frame 80. The insertion section 71c is bent and inserted into the insertion groove 82b of the holding frame 80.

The fixing member 72 is a member that fixes the refrigerant holder 71. The fixing member 72 is a plate-shaped member as shown in FIGS. 6 and 8. The fixing member 72 is made, for example, of metal. The fixing member 72 includes a frame 72a, which has a rectangular-frame-like shape, attachment sections 72b, and insertion sections 72c. The frame 72a covers an outer edge portion of the refrigerant holder 71, as shown in FIGS. 7 and 8. The holding frame 80, the refrigerant holder 71, and the frame 72a are layered on each other in the direction in which light passes through the light modulator unit 4G (optical axis direction X). In the following description, the direction in which the holding frame 80, the refrigerant holder 71, and the frame 72a are layered on each other is simply called a "layering direction." The fixing member 72 fixes the refrigerant holder 71 in such a way that the frame 72a and the holding frame 80 sandwich the refrigerant holder 71 in the layering direction (optical axis direction X).

The inner edge of the frame 72a is so provided as to be shifted outward from the inner edge of the refrigerant holder 71. A portion of the refrigerant holder 71, that is, the portion inside the frame 72a in the present embodiment is exposed when viewed in the layering direction from the side facing the fixing member 72.

The attachment sections 72b are provided at four end portions of the frame 72a, opposite end portions in the upward/downward direction Z and opposite end portions in the width direction Y, as shown in FIGS. 6 and 8. The attachment sections 72b protrude from the frame 72a toward the holding frame 80 (+X side). The attachment sections 72b engage with protrusions provided at the side surface of the holding frame 80. The fixing member 72 is thus fixed to the holding frame 80.

The insertion sections 72c are provided at the opposite ends of the frame 72a in the upward/downward direction Z. The insertion sections 72c protrude from the frame 72a toward the holding frame 80 (+X side). The insertion sections 72c are inserted into the insertion grooves 82a and 82b of the holding frame 80. The insertion sections 72c press the insertion sections 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is connected to the refrigerant sender 50, as shown in FIG. 9. In more detail, the connector 54 of the refrigerant sender 50 is connected to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that no connector 54 is connected to the refrigerant holder 71B or the refrigerant holder 71R.

In the present embodiment, linkage sections 73a and 73b, which are each formed of a porous member, are provided and link the refrigerant holders 71, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage sections 73a and 73b, respectively.

The linkage section 73a links the refrigerant holder 71G attached to the light modulation unit 4G to the refrigerant holder 71B attached to the light modulation unit 4B. The refrigerant holder 71B is thus connected to the connector 54 of the refrigerant sender 50 via the refrigerant holder 71G. The linkage section 73a is provided with a coating 74, which coats the linkage section 73a, as shown in FIG. 6. The coating 74 is, for example, a film made of resin.

The linkage section 73b links the refrigerant holder 71G attached to the light modulation unit 4G to the refrigerant holder 71R attached to the light modulation unit 4R. The refrigerant holder 71R is thus connected to the connector 54 of the refrigerant sender 50 via the refrigerant holder 71G. Although not shown, the linkage section 73b is similarly provided with a coating 74, as is the linkage section 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage section 73a and to the refrigerant holder 71R via the linkage section 73b. The refrigerant W generated by the refrigerant generator 20 is thus sent to the three light modulation units 4R, 4G, and 4B. The refrigerant W sent to and held by the refrigerant holders 71 then vaporizes to cool the light modulation units 4R, 4G, and 4B, which are each the cooling target. In more detail, the refrigerant W held by the refrigerant holders 71 vaporizes to cool the holding frames 80, to which the refrigerant holders 71 are attached, so that the light modulators 4RP, 4GP, and 4BP held by the holding frames 80 are cooled. The cooler 10 can thus cool the light modulators 4RP, 4GP, and 4BP, which are each the cooling target.

The projector 1 further includes a controller 90, which controls the cooler 10, as shown in FIG. 2. In the present embodiment, the controller 90 controls the first blower 60, as the cooling blower, and the refrigerant generator 20. The controller 90 drives at least part of the cooler 10 for a predetermined period in a state in which the projector 1 is not in operation. In the present embodiment, the controller 90 drives at least part of the cooler 10 by using the electric power supplied from the electricity accumulator 100 in the state in which the projector 1 is not in operation. The predetermined period varies as appropriate in accordance with a driven portion. The predetermined period includes a predetermined refrigerant generation period, which will be described later, a predetermined cooling period, a predetermined air blow period, and a predetermined rotation period. In the present specification, the state in which the projector 1 is not in operation includes a state in which the projection optical apparatus 6 projects no light.

In the present embodiment, the controller 90 drives the refrigerant generator 20 to cause it to generate the refrigerant W for the refrigerant generation period in the state in which the projector 1 is not in operation. Specifically, the controller 90 drives the first blower 60, the heating main body 22, the motor 24, and the second blower 23 for the refrigerant generation period in the state in which the projector 1 is not in operation. The heat exchanger 30 thus generates the refrigerant W during the period for which the projector 1 is not in operation.

In the present embodiment, the refrigerant W generated during the period for which the projector 1 is not in operation is stored, for example, in the first lid 32 and the second lid 33. A tank that stores the refrigerant W generated during the period for which the projector 1 is not in operation may be separately provided. The length of the refrigerant generation period approximately ranges, for example, from several tens of minutes to several hours. The length of the refrigerant generation period is determined in accordance, for example, with the amount of storable refrigerant W.

For example, the operation of driving the refrigerant generator 20 during the period for which the projector 1 is not in operation is not performed by the controller 90 immediately after the projector 1 stops its operation but is performed after a certain period thereafter. The operation of driving the refrigerant generator 20 during the period for which the projector 1 is not in operation may be performed by the controller 90 immediately after the projector 1 stops its operation. In this case, the controller 90 drives the refrigerant generator 20 to cause it to generate the refrigerant W for the refrigerant generation period after the projector 1 stops its operation.

The controller 90 memorizes, for example, the time frame for which the projector 1 is not in operation for a long time every day, that is, the time frame for which the projector 1 is not in use for a long time and drives the refrigerant generator 20 to cause it to generate the refrigerant W for the refrigerant generation period in the time frame. As an example, when the projector 1 is not in use at night and is therefore not in operation, the controller 90 drives the refrigerant generator 20 to cause it to generate the refrigerant W at night. The controller 90 may change the length of the refrigerant generation period in accordance with the period for which the projector 1 is not in operation.

In the present embodiment, the controller 90 drives the first blower 60, which is the cooling blower, for the cooling period after the projector 1 stops its operation. The state in which the air AR1 from the first blower 60 is delivered to the light modulation units 4R, 4G, and 4B, which are each the cooling target, is thus maintained for the cooling period immediately after the projector 1 stops its operation.

In the present embodiment, the controller 90 drives the first blower 60, which is the cooling blower, for the cooling period after the operation of driving the refrigerant generator 20 for the refrigerant generation period described above is completed. That is, in the present embodiment, the controller 90 drives the first blower 60 for the cooling period in the following two cases: when the projector 1 stops its operation; and when the operation of driving the refrigerant generator 20 is completed in the state in which the projector 1 is not in operation.

The length of the cooling period is, for example, shorter than the length of the refrigerant generation period. The length of the cooling period approximately ranges, for example, from several tens of seconds to several minutes. The length of the cooling period is determined based, for example, on the amount of refrigerant W supplied to the cooling target per unit time, the temperature and humidity in the projector 1, and the temperature and humidity in the external environment in which the projector 1 is installed.

In the present embodiment, the controller 90 drives the second blower 23 for the air blow period after the projector 1 stops its operation. The state in which the air AR2 circulates through the circulation path 27 is thus maintained for the air blow period immediately after the projector 1 stops its operation. In the present embodiment, the controller 90 drives the motor 24 to cause it to rotate the moisture absorbing/discharging member 40 for the rotation period after the projector 1 stops its operation. The state in which the moisture absorbing/discharging member 40 rotates is thus maintained for the rotation period immediately after the projector 1 stops its operation.

The length of the air blow period and the length of the rotation period each approximately range, for example, from several tens of seconds to several minutes. The length of the air blow period and the length of the rotation period are, for example, shorter than the length of the refrigerant generation period. The length of the air blow period and the length of the rotation period may be equal to or differ from the length of the cooling period. The length of the air blow period and the length of the rotation period may differ from or be equal to each other. In the present embodiment, the length of the air blow period and the length of the rotation period are, for example, equal to each other. That is, in the present embodiment, the state in which both the second blower 23 and the motor 24 are driven is maintained for the same period immediately after the projector 1 stops its operation.

The length of the air blow period and the length of the rotation period are determined based, for example, on the temperature of the moisture absorbing/discharging member 40 that occurs when the projector 1 stops its operation. The temperature of the moisture absorbing/discharging member 40 that occurs when the projector 1 stops its operation may, for example, be an average experimentally determined in advance or may be a value measured with a temperature sensor that is not shown.

The controller 90 may so set the output of the second blower 23 when driving the second blower 23 for the air blow period in the state in which the projector 1 is not in operation as to differ from the output of the second blower 23 when causing the refrigerant generator 20 to generate the refrigerant W. The controller 90 may so set the output of the motor 24 when driving the motor 24 for the rotation period in the state in which the projector 1 is not in operation as to differ from the output of the motor 24 when causing the refrigerant generator 20 to generate the refrigerant W.

In the present embodiment, the controller 90 drives the second blower 23 for the air blow period after the operation of driving the refrigerant generator 20 for the refrigerant generation period described above is completed. In the present embodiment, the controller 90 drives the motor 24 to cause it to rotate the moisture absorbing/discharging member 40 for the rotation period after the operation of driving the refrigerant generator 20 for the refrigerant generation period described above is completed. That is, in the present embodiment, the controller 90 drives the second blower 23 and the motor 24 during the respective predetermined periods in the following two cases: when the projector 1 stops its operation; and when the operation of driving the refrigerant generator 20 in the state in which the projector 1 is not in operation is completed.

In the present embodiment, the controller 90 drives the first blower 60, the heating main body 22a, the motor 24, and the second blower 23 when the controller 90 drives the refrigerant generator 20 for the refrigerant generation period. Therefore, in the present embodiment, the controller 90 continuously drives the heating main body 22a, the motor 24, and the second blower 23 in the refrigerant generator 20 for the respective predetermined periods after the operation of driving the refrigerant generator 20 for the refrigerant generation period is completed.

During the operation of driving the refrigerant generator 20 for the refrigerant generation period, the first blower 60, the second blower 23, and the motor 24 have been already driven. Therefore, during the operation of driving the refrigerant generator 20 for the refrigerant generation period, the three types of operation described above, the operation of driving the first blower 60 for the cooling period, the operation of driving the second blower 23 for the air blow period, and the operation of driving the motor 24 for the rotation period, are not performed. Therefore, in the present embodiment, when the refrigerant generator 20 is driven for the refrigerant generation period immediately after the projector 1 stops its operation, the three types of operation described above, the operation of driving the first blower 60 for the cooling period, the operation of driving the second blower 23 for the air blow period, and the operation of driving the motor 24 for the rotation period, are not performed immediately after the projector 1 stops its operation.

According to the present embodiment, the cooler 10 can cool the cooling target by causing the refrigerant sender 50 to send the refrigerant W generated by the refrigerant generator 20 to the cooling target and using vaporization of the refrigerant W, which is an endothermic reaction, to draw heat from the cooling target. The cooling based on the vaporization of the refrigerant W can actively draw heat from the cooling target and therefore has excellent cooling performance as compared with air cooling and liquid cooling, in which a cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore causes no increase in noise produced by the cooler 10. The present embodiment therefore provides a projector 1 including a cooler 10 that excels in cooling performance, has a compact size, and excels in quietness.

According to the present embodiment, in which the refrigerant generator 20 can generate the refrigerant W, a user's convenience can be improved because the user does not need to replenish the refrigerant W. Further, since the refrigerant generator 20 can perform adjustment in such a way that it generates the refrigerant W by a necessary amount as required, there is no need for storage of the refrigerant W, for example, in a storage tank, whereby the weight of the projector 1 can be reduced.

According to the present embodiment, the controller 90 drives the refrigerant generator 20 to cause it to generate the refrigerant W for the refrigerant generation period in the state in which the projector 1 is not in operation. The refrigerant W can therefore be generated and stored during the period for which the projector 1 is not in operation. An insufficient amount of refrigerant W can thus be avoided when the projector is in use, whereby the cooling target can be preferably cooled. Immediately after the use of the projector 1 starts, the refrigerant W has been already generated, whereby the cooling of the cooling target can be quickly initiated. Further, the amount of refrigerant W required to be generated during the operation of the projector 1 can be reduced. The cooling target can therefore be preferably cooled even when the refrigerant generation performance of the refrigerant generator 20 is lowered. Lowering the refrigerant generation performance of the refrigerant generator 20 readily allows reduction in size of the refrigerant generator 20. Specifically, for example, lowering the refrigerant generation performance of the refrigerant generator 20 in the present embodiment allows reduction in sizes of the moisture absorbing/discharging member 40 and the heat exchanger 30. The size of the refrigerant generator 20 can therefore be reduced.

For example, when the projector 1 stops its operation and the operation of driving the cooler 10 is therefore terminated, the cooling blower, which delivers air to the cooling target, also stops operating. In this case, the refrigerant W delivered to the cooling target does not vaporize but could remain adhering to the cooling target. Further, the air around the cooling target has higher humidity due to the vaporization of the refrigerant W. Therefore, when the projector 1 stops its operation and the temperature of the cooling target therefore lowers, the refrigerant W in the air around the cooling target could form dew condensation on the cooling target. The refrigerant W could therefore cause erosion of metal members of the cooling target and other problems.

In contrast, according to the present embodiment, the controller 90 drives the first blower 60, which is the cooling blower, for the cooling period after the projector 1 stops its operation. The air AR1 delivered from the first blower 60 after the projector 1 stops its operation therefore allows the refrigerant W that has not vaporized but has left on the cooling target to vaporize. Further, the air AR1 delivered from the first blower 60 allows the air having higher humidity resulting from the vaporization of the refrigerant W to be removed from the space around the cooling target. The dew condensation on the cooling target resulting from the refrigerant W can therefore be suppressed. The problems with the cooling target can therefore be suppressed.

The controller 90 may drive the first blower 60 until the controller 90 determines based, for example, on the temperature of the cooling target, the temperature and humidity in the projector 1, and the temperature and humidity in the external environment after the projector 1 stops its operation that no dew condensation occurs on the cooling target. The dew condensation on the cooling target resulting from the refrigerant W can therefore be preferably suppressed.

According to the present embodiment, the moisture absorbing/discharging member 40 can absorb water vapor contained in the air AR1 delivered from the first blower 60, and the moisture absorbed by the moisture absorbing/discharging member 40 can be discharged in the form of water vapor into the air AR2 delivered by the second blower 23. The heat exchanger 30 then allows the moisture discharged in the form of water vapor into the air AR2 to condense into the refrigerant W. Therefore, according to the present embodiment, the refrigerant W can be generated from the atmosphere in the projector 1.

According to the present embodiment, the heat exchanger 30 is cooled by the air AR1 having been discharged from the first blower 60 and having passed through the moisture absorbing/discharging member 40. No cooling section that cools the heat exchanger 30 therefore needs to be separately provided, whereby an increase in the number of parts of the projector 1 can be suppressed. Further, an increase in noise produced by the projector 1 can be suppressed as compared with a case where a blower is separately provided as the cooling section that cools the heat exchanger 30.

Further, for example, a portion of the moisture absorbing/discharging member 40 that is the portion located in the second region F2 is heated by the heater 22. When the projector 1 stops its operation and the cooler 10 therefore stopes its operation, the temperature of a portion of the moisture absorbing/discharging member 40 that is the portion located in the second region F2 is relatively high in some cases. In this case, the heat from the moisture absorbing/discharging member 40 could damage members around the moisture absorbing/discharging member 40 and cause other problems.

In contrast, according to the present embodiment, the controller 90 drives the second blower 23 for the air blow period after the projector 1 stops its operation. The second blower 23 can therefore deliver the air AR2 to a portion of the moisture absorbing/discharging member 40 that is the portion heated by the heater 22. The heated moisture absorbing/discharging member 40 can thus be cooled, whereby damage of members around the moisture absorbing/discharging member 40 and other problems can be suppressed.

According to the present embodiment, the controller 90 drives the motor 24 to cause it to rotate the moisture absorbing/discharging member 40 for the rotation period after the projector 1 stops its operation. The motor 23 can therefore change the position of a portion of the moisture absorbing/discharging member 40 that is the portion heated by the heater 22 and therefore having a relatively high temperature. Causing the same portion continuously to be heated by the moisture absorbing/discharging member 40 can therefore be suppressed, whereby damage of members around the moisture absorbing/discharging member 40 and other problems can be further suppressed.

Further, for example, when the refrigerant generator 20 is driven to generate the refrigerant W for the refrigerant generation period in the state in which the projector 1 is not in operation as described above, and when the operation of driving the refrigerant generator 20 is terminated after the refrigerant generation period elapses, the heat from the moisture absorbing/discharging member 40 could also cause damage of members around the moisture absorbing/discharging member 40 and other problems, as in the case where the projector 1 stops its operation.

In contrast, according to the present embodiment, the controller 90 drives the second blower 23 for the air blow period after the operation of driving the refrigerant generator for the refrigerant generation period is completed. Therefore, even when the refrigerant W is generated in the state in which the projector 1 is not in operation, damage of members around the moisture absorbing/discharging member 40 and other problems can be suppressed.

According to the present embodiment, the controller 90 drives the motor 24 to cause it to rotate the moisture absorbing/discharging member 40 for the rotation period after the operation of driving the refrigerant generator 20 for the refrigerant generation period is completed. Therefore, even when the refrigerant W is generated in the state in which the projector 1 is not in operation, damage of members around the moisture absorbing/discharging member 40 and other problems can be further suppressed.

The controller 90 may drive the second blower 23 and the motor 24 after the projector 1 stops its operation or after the operation of driving the refrigerant generator 20 for the refrigerant generation period is completed but until the temperature of the moisture absorbing/discharging member 40 becomes a predetermined temperature or lower. Damage of members around the moisture absorbing/discharging member 40 and other problems can be more preferably suppressed.

According to the present embodiment, the first blower 60 is the cooling blower that delivers the air AR1 to the light modulation units 4R, 4G, and 4B, which are each the cooling target. The air AR1 therefore causes the refrigerant W delivered to the light modulation units 4R, 4G, and 4B to readily vaporize, whereby the light modulation units 4R, 4G, and 4B can be further cooled. Further, no cooling blower that cools the cooling target needs to be provided separately from the first blower 60, whereby an increase in the number of parts of the projector 1 can be suppressed, and an increase in noise produced by the projector 1 can be suppressed.

In the present embodiment, the first blower 60, which is an intake fan that takes outside air into the projector 1, is used to facilitate the vaporization of the refrigerant W delivered to the cooling target, as described above. The same cooling performance as that provided in a case where no cooler 10 is provided can be provided even when the output of the first blower 60 is lowered. The noise produced by the first blower 60 can therefore be reduced by lowering the output of the first blower 60, which is an intake fan, whereby the quietness of the projector can be further improved.

According to the present embodiment, the controller 90 drives at least part of the cooler 10 by using the electric power supplied from the electricity accumulator 100 in the state in which the projector 1 is not in operation. Therefore, for example, even when the external power supply that supplies the projector 1 with electric power is disconnected from the projector 1, and the projector 1 therefore suddenly stops its operation, the electricity accumulator 100 can drive at least part of the cooler 10.

Further, for example, in the refrigerant generator 20, when the humidity of the air AR2 delivered from the second blower 23 to the heat exchanger 30 is relatively low, cooling the heat exchanger 30 is unlikely to allow generation of the refrigerant W in some cases. For example, when air or any other substance outside the projector 1 mixes with the air AR2 delivered to the heat exchanger 30, the humidity of the air AR2 lowers in some cases.

In contrast, according to the present embodiment, the refrigerant generator 20 has the circulation path 27, through which the air AR2 discharged from the second blower 23. Substantially sealing the circulation path 27 can therefore suppress entry of air outside the projector 1 into the circulation path 27, whereby the humidity of the air AR2 delivered to the heat exchanger 30 can be readily maintained relatively high. Cooling the heat exchanger 30 therefore allows the refrigerant W to be preferably generated.

According to the present embodiment, the heater 22 includes the heating main body 22a, which heats the air AR2 before passing through a portion of the moisture absorbing/discharging member 40 that is the portion located in the second region F2, and the second blower 23. The heater 22, in which the second blower 23 delivers the air AR2 to the moisture absorbing/discharging member 40, can therefore heat a portion of the moisture absorbing/discharging member 40 that is the portion located in the second region F2. The heater can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the first region F1 can preferably absorb water vapor from the air AR1, and a portion of the moisture absorbing/discharging member 40 that is the portion located in the second region F2 can preferably discharge moisture into the air AR2. The refrigerant W can therefore be efficiently generated.

According to the present embodiment, the refrigerant sender 50 sends the refrigerant W based on capillarity. No pump or any other power source for sending the refrigerant W therefore needs to be separately provided. An increase in the number of parts of the projector 1 can therefore be suppressed, whereby the size and weight of the projector 1 are each readily reduced by a greater amount.

According to the present embodiment, the refrigerant sender 50 includes the connector 54, which is formed of a porous member and connects the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is connected to the connector 54. The second catcher 52 can therefore absorb the refrigerant W accumulated in the second lid 33 and send the absorbed refrigerant W to the connector 54 based on capillarity. The generated refrigerant W is therefore readily delivered with no waste to the cooling target.

According to the present embodiment, the refrigerant sender 50 includes the first catcher 51, which is provided in the first lid 32, and the third catcher 53, which connects the first catcher 51 to the second catcher 52. The first catcher 51 can therefore absorb the refrigerant W having accumulated in the first lid 32 and send the absorbed refrigerant W to the second catcher 52 via the third catcher 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target.

According to the present embodiment, the third catcher 53 passes through one of the pipes 31a. The third catcher 53 can therefore absorb the refrigerant W having accumulated in the pipe 31a and send the absorbed refrigerant W to the cooling target via the second catcher 52 and the connector 54. The generated refrigerant W is therefore readily delivered with no waste to the cooling target.

According to the present embodiment, the width of the connector 54 is greater, for example, than the width of the first catcher 51, the width of the second catcher 52, and the width of the third catcher 53. The width of the connector 54 is therefore readily increased to a relatively large value, whereby the amount of refrigerant W that can be sent by the connector 54 can be increased. The refrigerant sender 50 therefore readily delivers the refrigerant W to the cooling target, whereby the cooling target is readily further cooled.

On the other hand, the width of the first catcher 51, the width of the second catcher 52, and the width of the third catcher 53 are each readily set at a relatively small value. The amount of refrigerant W held by each of the first catcher 51, the second catcher 52, and the third catcher 53 can therefore be reduced. The amount of refrigerant W held by the first catcher 51, the second catcher 52, and the third catcher 53 and hence left in the heat exchanger 30 can therefore be reduced, whereby the generated refrigerant W is readily delivered with no waste to the cooling target.

According to the present embodiment, the refrigerant holders 71, which hold the refrigerant W, are provided in the light modulation units 4R, 4G, and 4B, which are each the cooling target. The refrigerant holders 71 therefore allow the refrigerant W sent to the light modulation units 4R, 4G, and 4B to be held in the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holders 71 are attached to surfaces of the light modulation units 4R, 4G, and 4B, which are each the cooling target, and the refrigerant holders 71 are each formed of a porous member. At least part of each of the refrigerant holders 71 is exposed when viewed in the layering direction from the side facing the refrigerant holder 71. The refrigerant W therefore readily vaporizes via the exposed portion of each of the refrigerant holders 71, whereby the cooling performance of the cooler 10 can be further improved. Further, the refrigerant holders 71, which are each formed of a porous member, readily uniformly distribute the refrigerant W across the surfaces of the cooling target, which is provided with the refrigerant holders 71, based on capillarity, whereby the cooling target is readily further cooled.

For example, when the refrigerant holders 71 are fixed to the holding frames 80 with an adhesive, the pores in the refrigerant holders 71, which are each formed of a porous member, are closed in some cases with the adhesive absorbed by the refrigerant holders 71. The refrigerant holders 71 are therefore unlikely to absorb or hold the refrigerant W in some cases.

In contrast, according to the present embodiment, the fixing members 72 are so provided as to fix the refrigerant holders 71 in such a way that the fixing members 72 and the holding frames 80 sandwich the refrigerant holders 71. The refrigerant holders 71 can therefore be fixed to the holding frames 80 with use of no adhesive. The situation in which the refrigerant holders 71 are unlikely to hold the refrigerant W can therefore be suppressed. Further, in the present embodiment, the fixing members 72 are made of metal. The fixing members 72 therefore have relatively high heat conductivity and are hence likely to be cooled. The air AR1 from the first blower 60 and the vaporization of the refrigerant W therefore readily lower the temperature of the fixing members 72, whereby the cooling target, which is in contact with fixing members 72, is readily further cooled.

According to the present embodiment, the refrigerant holder 71G is provided on a surface of the holding frame 80 that is the surface facing the light incident side of the light modulator 4GP. The configuration described above can suppress influence of the water vapor that is the refrigerant W having vaporized from the refrigerant holder 71G on the light outputted from the light modulator 4GP to the light combining system 5 and can therefore suppress formation of noise in an image projected from the projector 1.

According to the present embodiment, the refrigerant holders 71 are provided in the plurality of light modulation units 4R, 4G, and 4B, and the linkage sections 73a and 73b are provided and link the plurality of refrigerant holders 71 to each other. Connecting the refrigerant sender 50 to one of the refrigerant holders 71 therefore allows the refrigerant W to be sent to the other refrigerant holders 71. The routing of the refrigerant sender 50 in the projector 1 can therefore be simplified.

According to the present embodiment, the linkage sections 73a and 73b are provided with the respective coatings 74, which coat the linkage sections 73a and 73b. A situation in which the refrigerant W that moves along the linkage sections 73a and 73b vaporizes via the linkage sections 73a and 73b can therefore be suppressed. Therefore, a situation in which the refrigerant W vaporizes without contributing to the cooling of the light modulation units 4R, 4G, and 4B, which are each the cooling target, can be suppressed, whereby waste of the generated refrigerant W can be suppressed.

In the present embodiment, the connector 54 may also be coated, as are the linkage sections 73a and 73b. The configuration described above can suppress vaporization of the refrigerant W being sent to the cooling target. Therefore, the refrigerant W can be efficiently sent to the cooling target, and waste of the generated refrigerant W can be further suppressed. The circumference of each of the connector 54 and the linkage sections 73a and 73b may instead be covered, for example, with a tube. A coating treatment that suppresses the vaporization may still instead be performed on the surface of each of the connector 54 and the linkage sections 73a and 73b.

In the present embodiment, the following configurations and methods are also employable.

The controller does not necessarily operate in a specific way and may operates in anyway in which at least part of the cooler is driven for a predetermined period in the state in which the projector 1 is not in operation. The controller may drive only part of the cooler in the state in which the projector 1 is not in operation. For example, the controller may drive only one of the refrigerant generator, the first blower, the second blower, and the driver (motor) or may drive two or more or three or less of the components described above in the state in which the projector 1 is not in operation.

The controller may drive at least part of the cooler by using the electric power supplied from the external power supply connected to the projector in the state in which the projector 1 is not in operation. According to the configuration described above, the electric power is readily supplied to the cooler in a stable manner, and the cooler can therefore be stably driven, as compared with the case where the electricity accumulator supplies the electric power. In particular, since a large number of parts are required to be driven to drive the refrigerant generator, and the period for which the parts are driven is relatively long, a relatively large amount of electric power is required. Using electric power from the external power supply therefore allows the refrigerant generator to be stably driven in the state in which the projector 1 is not in operation.

The controller may evaluate whether or not the external power supply is connected to the projector and determine whether the external power supply supplies the projector with electric power to allow at least part of the cooler to be driven or the electricity accumulator supplies the projector with electric power to allow at least part of the cooler to be driven. In this case, when the controller determines that the external power supply is connected to the projector, the controller drives at least part of the cooler with electric power supplied from the external power supply in the state in which the projector 1 is not in operation. On the other hand, when the controller determines that no external power supply is connected to the projector, the controller drives at least part of the cooler with electric power supplied from the electricity accumulator in the state in which the projector 1 is not in operation.

The controller may change the source of the electric power supplied to the projector, that is, whether the electric power is supplied from the external power supply or the electricity accumulator in accordance, for example, with a part to be driven. For example, the controller may use the electric power from the external power supply to drive the refrigerant generator for the refrigerant generation period and use the electric power from the electricity accumulator to drive the cooling blower (first blower) for the cooling period, the second blower for the air blow period, and the driver (motor) for the rotation period.

The electricity accumulator is not limited to a specific component and may be any component capable of accumulating electricity. The electricity accumulator may be a non-chargeable battery or a capacitor. The electricity accumulator may be used only in the state in which the projector 1 is not in operation. The electricity accumulator may supply only the cooler with the electric power. A plurality of electricity accumulators may be provided. The electricity accumulator may be provided, for example, for each part driven in the cooler. No electricity accumulator may be provided.

The heater is not limited to that in the embodiment described above. The heater may be in contact with the moisture absorbing/discharging member and heat the moisture absorbing/discharging member. In this case, the heater may not heat the air before passing through the moisture absorbing/discharging member. Further, in this case, for example, when the heater is a heater using a heating wire, the heater undesirably keeps heating the same portion of the moisture absorbing/discharging member with the heating wire remaining at a high temperature after the projector stops its operation or after the projector stops its operation and then the operation of driving the refrigerant generator is terminated. The heat from the heating wire could therefore damage the moisture absorbing/discharging member. Even in the case described above, driving the second blower for the air blow period after the projector stops its operation or after the operation of driving the refrigerant generator is terminated, as in the embodiment described above, allows the heating wire and the moisture absorbing/discharging member to be cooled with the air from the second blower. Damage of the moisture absorbing/discharging member due to the heat can therefore be suppressed. Further, rotating the moisture absorbing/discharging member for the rotation period after the projector stops its operation or after the operation of driving the refrigerant generator is terminated, as in the embodiment described above, allows a portion of the moisture absorbing/discharging member that is the portion heated with the heating wire to be changed. Damage of the moisture absorbing/discharging member due to the heat can therefore be further suppressed.

The cooling blower in the embodiment described above is the first blower 60 provided in the refrigerant generator 20, but not necessarily. The cooling blower may be provided separately from the blowers provided in the refrigerant generator 20. In this case, the operation of driving the cooling blower in the state in which the projector 1 is not in operation does not interfere with the operation of driving the refrigerant generator. The cooling blower can therefore be driven for the cooling period irrespective of whether the refrigerant generator is driven or not in the refrigerant generation period.

The cooling target in the embodiments described above is the light modulation units, but not necessarily. The cooling target may include at least one of the light modulators, the light modulation units, the light source apparatus, a wavelength converter that converts the wavelength of the light outputted from the light source apparatus, a diffuser that diffuses the light outputted from the light source apparatus, and a polarization converter that converts the polarization direction of the light outputted from the light source apparatus. According to the configuration described above, each portion of the projector can be cooled in the same manner described above.

In the embodiment described above, the description has been made with reference to the case where the present disclosure is applied to the transmission-type projector, and the present disclosure is also applicable to a reflection-type projector. The term "transmission-type" means that the light modulators each including a liquid crystal panel or any other component transmit light. The term "reflection-type" means that the light modulators reflect light. The light modulators are each not limited, for example, to a liquid crystal panel and may, for example, be a micromirror-based light modulator.

In the embodiment described above, the projector using the three light modulators has been presented by way of example. The present disclosure is also applicable to a projector using only one light modulator and a projector using four or more light modulators.

The configurations described above can be combined with one another to the extent that the combination causes no contradiction.

What is claimed is:

1. A projector including a cooling target, the projector comprising:
    a light source configured to emit light;
    a light modulator configured to modulate the light emitted from the light source in accordance with an image signal;
    a projection optical apparatus configured to project the light modulated by the light modulator;
    a cooler configured to cool the cooling target based on transformation of a refrigerant into a gas; and
    a controller configured to control the cooler, wherein:
    the cooler includes
        a refrigerant generator configured to generate the refrigerant,
        a refrigerant sender configured to send the generated refrigerant toward the cooling target, and
        a cooling blower configured to deliver air to the cooling target, and
    the controller drives the refrigerant generator to generate the refrigerant for a predetermined refrigerant generation period in the state in which the projector is not in operation.

2. The projector according to claim 1,
    wherein the controller drives the cooling blower for a predetermined cooling period after the projector stops operation thereof.

3. The projector according to claim 1, further comprising
    an electricity accumulator configured to supply the cooler with electric power,
    wherein the controller drives the at least part of the cooler by using the electric power supplied from the electricity accumulator in the state in which the projector is not in operation.

4. The projector according to claim 1,
    wherein the cooling target is the light modulator.

5. A projector including a cooling target, the projector comprising:
    a light source configured to emit light;
    a light modulator configured to modulate the light emitted from the light source in accordance with an image signal;
    a projection optical apparatus configured to project the light modulated by the light modulator;
    a cooler configured to cool the cooling target based on transformation of a refrigerant into a gas; and
    a controller configured to control the cooler, wherein:
    the cooler includes
        a refrigerant generator configured to generate the refrigerant,
        a refrigerant sender configured to send the generated refrigerant toward the cooling target, and
        a cooling blower configured to deliver air to the cooling target,
    the controller drives the refrigerant generator to generate the refrigerant for a predetermined refrigerant generation period in the state in which the projector is not in operation, and
    the refrigerant generator includes a moisture absorbing/discharging member that sends gas vaporized from the refrigerant at the cooling target by the cooling blower, and a heat exchanger that generates the refrigerant from gas discharged from the moisture absorbing/discharging member.

6. The projector according to claim 5,
    wherein the controller
    drives the cooling blower for a predetermined cooling period after operation of driving the refrigerant generator for the refrigerant generation period is completed.

7. A projector including a cooling target, the projector comprising:
    a light source configured to emit light;
    a light modulator configured to modulate the light emitted from the light source in accordance with an image signal;
    a projection optical apparatus configured to project the light modulated by the light modulator;
    a cooler configured to cool the cooling target based on transformation of a refrigerant into a gas; and
    a controller configured to control the cooler, wherein:
    the cooler includes
        a refrigerant generator configured to generate the refrigerant,
        a refrigerant sender configured to send the generated refrigerant toward the cooling target, and
        a cooling blower configured to deliver air to the cooling target, and the controller drives at least part of the cooler for a predetermined period in a state in which the projector is not in operation, the refrigerant generator includes
- a rotating moisture absorbing/discharging member,
- a first blower configured to deliver air to a portion of the moisture absorbing/discharging member that is a portion located in a first region,
- a heat exchanger connected to the refrigerant sender,
- a heater configured to heat a portion of the moisture absorbing/discharging member that is a portion located in a second region different from the first region, and
- a second blower configured to deliver, to the heat exchanger, air around a portion of the moisture absorbing/discharging member that is the portion heated by the heater, and the heat exchanger, when cooled, generates the refrigerant from the air flowing into the heat exchanger.

8. The projector according to claim 7, wherein the controller drives the second blower for a predetermined air blow period after the projector stops operation thereof.

9. The projector according to claim 7, wherein the controller drives the refrigerant generator to generate the refrigerant for a predetermined refrigerant generation period in the state in which the projector is not in operation, and drives the second blower for a predetermined air blow period after operation of driving the refrigerant generator for the refrigerant generation period is completed.

10. The projector according to claim 9, wherein:

the refrigerant generator includes a driver configured to rotate the moisture absorbing/discharging member, and the controller drives the driver to rotate the moisture absorbing/discharging member for a predetermined rotation period after the operation of driving the refrigerant generator for the refrigerant generation period is completed.

11. The projector according to claim 7, wherein:

the refrigerant generator includes a driver configured to rotate the moisture absorbing/discharging member, and the controller drives the driver to rotate the moisture absorbing/discharging member for a predetermined rotation period after the projector stops operation thereof.

12. The projector according to claim 11, wherein the controller drives the refrigerant generator to generate the refrigerant for a predetermined refrigerant generation period in the state in which the projector is not in operation, and drives the driver to rotate the moisture absorbing/discharging member for the rotation period after the operation of driving the refrigerant generator for the refrigerant generation period is completed.

13. The projector according to claim 7, wherein the first blower is the cooling blower.

* * * * *